United States Patent
Cho et al.

(10) Patent No.: US 11,101,991 B2
(45) Date of Patent: Aug. 24, 2021

(54) PRACTICAL REUSABLE FUZZY EXTRACTOR BASED ON THE LEARNING-WITH-ERROR ASSUMPTION AND RANDOM ORACLE

(71) Applicant: HRL Laboratories, LLC, Malibu, CA (US)

(72) Inventors: Chongwon Cho, Los Angeles, CA (US); Karim El Defrawy, Santa Monica, CA (US); Daniel C. Apon, College Park, MD (US); Jonathan Katz, Silver Spring, MD (US)

(73) Assignee: HRL Laboratories, LLC, Malibu, CA (US)

( * ) Notice: Subject to any disclaimer, the term of this patent is extended or adjusted under 35 U.S.C. 154(b) by 285 days.

(21) Appl. No.: 15/976,583

(22) Filed: May 10, 2018

(65) Prior Publication Data

US 2019/0020472 A1   Jan. 17, 2019

Related U.S. Application Data

(60) Provisional application No. 62/533,548, filed on Jul. 17, 2017, provisional application No. 62/533,572, filed on Jul. 17, 2017.

(51) Int. Cl.
*H04L 9/08* (2006.01)
*H04L 9/32* (2006.01)
*H04L 9/06* (2006.01)
*H04L 9/00* (2006.01)

(52) U.S. Cl.
CPC ............ *H04L 9/0866* (2013.01); *H04L 9/002* (2013.01); *H04L 9/0618* (2013.01); *H04L 9/3231* (2013.01)

(58) Field of Classification Search
CPC . H04L 9/002–005; H04L 9/0618–0637; H04L 9/0866; H04L 9/0869; H04L 9/3218–3221; H04L 9/3231; H04L 9/3278; H04L 63/0861
See application file for complete search history.

(56) References Cited

U.S. PATENT DOCUMENTS

| | | |
|---|---|---|
| 8,838,990 B2 | 9/2014 | Boult |
| 2011/0243320 A1 | 10/2011 | Halevi et al. |
| 2017/0185761 A1* | 6/2017 | Stanwood ............. H04L 9/0863 |

FOREIGN PATENT DOCUMENTS

| | | |
|---|---|---|
| CN | 106487511 A | 3/2017 |
| WO | WO2017-075063 A1 | 5/2017 |

OTHER PUBLICATIONS

Notification of Transmittal of International Search Report and the Written Opinion of the International Searching Authority for PCT/US2018/032124; dated Sep. 11, 2018.

(Continued)

*Primary Examiner* — Kevin Bechtel
(74) *Attorney, Agent, or Firm* — Tope-McKay & Associates (57) ABSTRACT

Described is a system for biometric authentication. The system converts biometric data into a cryptographic key r' using a reusable fuzzy extractor process having an underlying hash function modeling a random oracle model. The system allows access to secured services when a comparison of r' to a previously computed cryptographic key r shows a match.

14 Claims, 7 Drawing Sheets

(56) References Cited

OTHER PUBLICATIONS

International Search Report of the International Searching Authority for PCT/US2018/032124; dated Sep. 11, 2018.
Written Opinion of the International Searching Authority for PCT/US2018/032124; dated Sep. 11, 2018.
Notification and International Preliminary Report on Patentability (Chapter I) for PCT/US2018/032124; dated Jan. 30, 2020.
Charles Herder and Benjamin Fuller and Marten van Dijk and Srinivas Devadas, Public Key Cryptosystems with Noisy Secret Keys, Cryptology ePrint Archive, Report 2017/210, 2017, pp. 1-36.
Xavier Boyen. Reusable cryptographic fuzzy extractors. In ACM CCS '04: 11th ACM Conf. on Computer and Communications Security, pp. 82-91. ACM Press, 2004.
Ran Canetti, Benjamin Fuller, Omer Paneth, Leonid Reyzin, and Adam D. Smith. Reusable fuzzy extractors for low-entropy distributions. In Advances in Cryptology—Eurocrypt 2016, Part I, vol. 9665 of LNCS, pp. 117-146. Springer, 2016.
Oded Regev. On lattices, learning with errors, random linear codes, and cryptography. In Harold N. Gabow and Ronald Fagin, editors, 37th Annual ACM Symposium on Theory of Computing (STOC), pp. 84-93. ACM Press, May 2005.
Mihir Bellare and Phillip Rogaway. 1993. Random oracles are practical: a paradigm for designing efficient protocols. In Proceedings of the 1st ACM conference on Computer and communications security (CCS '93). ACM, New York, NY, USA, pp. 62-73.
Benjamin Fuller, Xianrui Meng, and Leonid Reyzin. Computational fuzzy extractors. In Advances in Cryptology—Asiacrypt 2013, Part I, vol. 8269 of LNCS, pp. 174-193. Springer, 2013.
English translation of CN106487511, Identity authentication method and device—Google Patents, downloaded Oct. 4, 2020.
Communication pursuant to Rules 70(2) and 70a(2) EPC (the supplementary European search report) for the European Regional Phase Patent Application No. 18836174.5, dated Mar. 30, 2021.
Apon, Daniel, et al., "Efficient, reusable fuzzy extractors from Lwe," Big Data Analytics in the Social and Ubiquitous Context: 5TH International Workshop On Modeling Social Media, MSM 2014, 5TH International Workshop On Mining Ubiquitous and Social Environments, Muse 2014 And Firs International Workshop On Machine Learning, Jun. 2, 2017.

* cited by examiner

PRACTICAL REUSABLE FUZZY EXTRACTOR BASED ON THE LEARNING-WITH-ERROR ASSUMPTION AND RANDOM ORACLE

GOVERNMENT LICENSE RIGHTS

This invention was made with government support under U.S. Government Contract Number 2016-16081000009. The government has certain rights in the invention.

CROSS-REFERENCE TO RELATED APPLICATIONS

This is a Non-Provisional patent application of U.S. Provisional Application No. 62/533,548, filed in the United States on Jul. 17, 2017, entitled, "Practical Reusable Fuzzy Extractor Based on the Learning-With-Error Assumption and Random Oracle," the entirety of which is hereby incorporated by reference.

This is also a Non-Provisional patent application of U.S. Provisional Application No. 62/533,572, filed in the United States on Jul. 17, 2017, entitled, "Reusable Fuzzy Extractor Based on the Learning-With-Error Assumption Secure Against Quantum Attacks," the entirety of which is hereby incorporated by reference.

BACKGROUND OF INVENTION

(1) Field of Invention

The present invention relates to a reusable fuzzy extractor (RFE) cryptographic system and, more particularly, to a RFE cryptographic system, which can be implemented with simple and efficient operations.

(2) Description of Related Art

Fuzzy extractors (FEs) convert biometric data into random strings, which makes it possible to apply cryptographic techniques for biometric security. Fuzzy extractors convert repeated noisy readings of a secret into the same uniformly distributed key. To eliminate noise, an initial enrollment phase takes the first noisy reading of the secret and produces a non secret helper string to be used in subsequent readings. Reusable fuzzy extractors (RFEs) remain secure even when this initial enrollment phase is repeated several times with noisy versions of the same secret, producing multiple helper strings (see the List of Incorporated Literature References, Literature Reference No. 3).

Existing RFE systems are not practical for real world applications. For instance, the reusable fuzzy extractor described in Literature Reference No. 2 provides weak security. Both Literature References No. 1 and 3 describe reusable fuzzy extractors that are impractical as they rely on very expensive cryptographic tools, such as a digital locker (see Literature Reference No. 3) or multilinear graded encoding (see Literature Reference No. 1), resulting in very large public strings (larger than 50~100 Megabytes (MB)) and slow in the running times for Gen and Rep algorithms. Additionally, previous results in prior art relied on the existence of expensive cryptographic tools.

Thus, a continuing need exists for a RFE which can be implemented with simple and efficient operations and is deployable in real applications.

SUMMARY OF INVENTION

The present invention relates to a reusable fuzzy extractor (RFE) cryptographic system and, more particularly, to a RFE cryptographic system, which can be implemented with simple and efficient operations. The system comprises one or more processors and a non-transitory computer-readable medium having executable instructions encoded thereon such that when executed, the one or more processors perform multiple operations. The system converts biometric data into a cryptographic key r' using a reusable fuzzy extractor process having an underlying hash function modeling a random oracle model. The system allows access to secured services when a comparison of r' to a previously computed cryptographic key r shows a match.

In another aspect, the reusable fuzzy extractor process comprises a generation process and a reconstruction process, wherein the generation process takes as input a public parameter and a first biometric input and outputs a public helper string and a first random string, and wherein the reconstruction process takes as input a public helper string and a second biometric input and outputs a second random string.

In another aspect, when the first biometric input is sufficiently similar to the second biometric input, the first random string is considered equivalent to the second random string, and the second random string is used to verify access to the secured data.

In another aspect, security of the reusable fuzzy extractor process is guaranteed based on a computational hardness assumption of a learning-with-error (LWE) problem and security of the underlying hash function.

In another aspect, the biometric data is a fingerprint and the secured data is accessed through a server.

In another aspect, the biometric data is a fingerprint and the secured data is accessed through a server, and wherein the system enables electronic communication between a user and a server. The electronic communication between the user and the server comprises the following: enrolling, by the user, a first fingerprint at the server; performing, by the server, the generation process for obtaining the public helper string and the first random string; encrypting, by the server, a message using the first random string as a cryptographic key for a symmetric encryption scheme, resulting in a ciphertext; storing, by the server, the public helper string; erasing, by the server, the first random string; authenticating the user, by the server, by processing a second fingerprint and performing the reconstruction for obtaining the second random string, wherein if the first fingerprint is sufficiently similar to the second fingerprint, then the first random string is considered equivalent to the second random string; and decrypting, by the server, the ciphertext using the second random string to obtain the message to verify the user attempting to access the server.

In another aspect, the system further comprises a fingerprint scanner for obtaining the biometric data.

In another aspect, the system further comprises an eye scanner for obtaining the biometric data.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a reusable fuzzy extractor (RFE) cryptographic system and, more particularly, to a RFE cryptographic system, which can be implemented with simple and efficient operations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is pro- vided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Charles Herder and Benjamin Fuller and Marten van Dijk and Srinivas Devadas, Public Key Cryptosystems with Noisy Secret Keys, Cryptology ePrint Archive, Report 2017/210, 2017.
2. Xavier Boyen. Reusable cryptographic fuzzy extractors. In ACM CCS '04: 11th ACM Conf. on Computer and Communications Security, pages 82-91. ACM Press, 2004.
3. Ran Canetti, Benjamin Fuller, Omer Paneth, Leonid Reyzin, and Adam D. Smith. Reusable fuzzy extractors for low-entropy distributions. In Advances in Cryptology—Eurocrypt 2016, Part I, volume 9665 of LNCS, pages 117-146. Springer, 2016.
4. Oded Regev. On lattices, learning with errors, random linear codes, and cryptography. In Harold N. Gabow and Ronald Fagin, editors, 37th Annual ACM Symposium on Theory of Computing (STOC), pages 84-93. ACM Press, May 2005.
5. Mihir Bellare and Phillip Rogaway. 1993. Random oracles are practical: a paradigm for designing efficient protocols. In Proceedings of the 1st ACM conference on Computer and communications security (CCS '93). ACM, New York, N.Y., USA, 62-73.
6. Benjamin Fuller, Xianrui Meng, and Leonid Reyzin. Computational fuzzy extractors. In Advances in Cryptology—Asiacrypt 2013, Part I, volume 8269 of LNCS, pages 174-193. Springer, 2013.

(2) PRINCIPAL ASPECTS

Various embodiments of the invention include three "principal" aspects. The first is a reusable fuzzy extractor (RFE) cryptographic system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
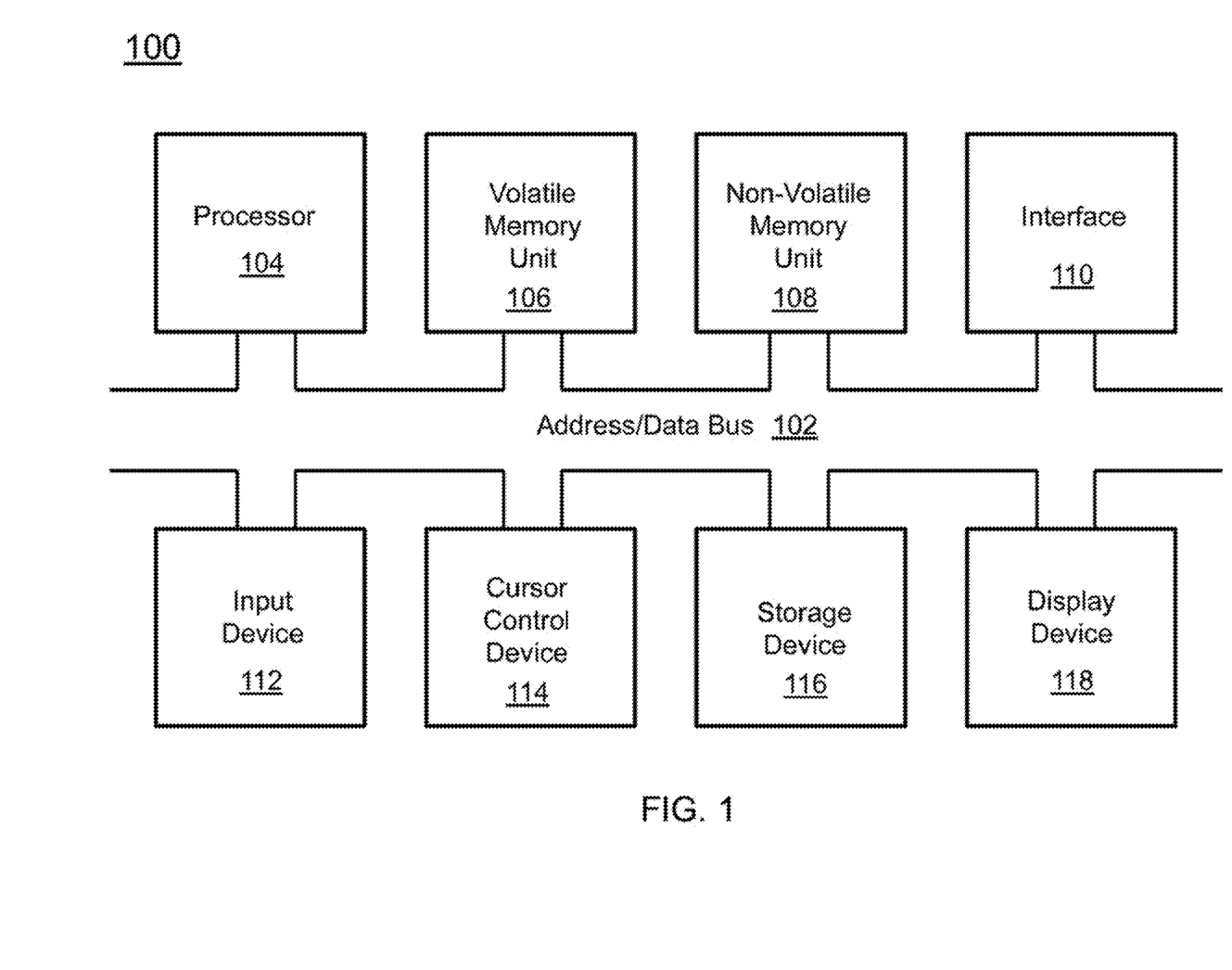
FIG. 1 is a block diagram depicting the components of a reusable fuzzy extractor (RFE) cryptographic system according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
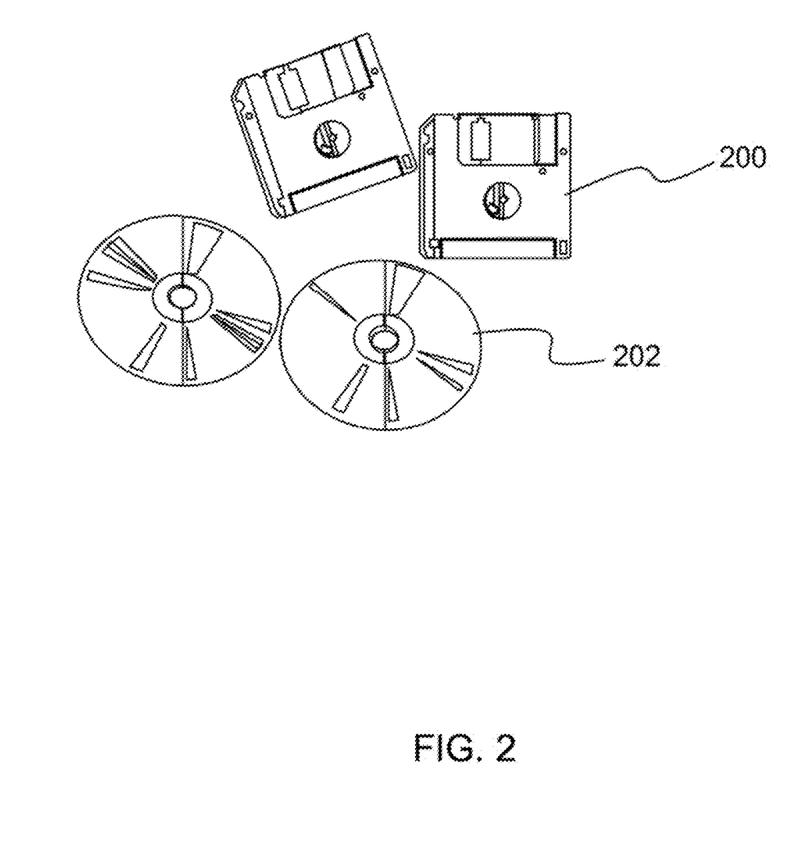
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a system for reusable fuzzy extractor (RFE) in the random oracle model (see Literature Reference No. 5 for a description of the random oracle model). A RFE is a cryptographic system of a pair of algorithms (Gen, Rec) such that Gen (generation algorithm) takes as an input a biometric feature m and outputs a pair of two strings (p, r), where p is a public helper string and r is a random string. Rec (reconstruction algorithm) takes as inputs two strings, a public string p, and a biometric reading m' and outputs a random string r' such that r=r' if and only if m' is sufficiently close to original m. The reusability of RFE guarantees that the information of random strings r's or m is not revealed by multiple public strings p's that are independently computed all with respect to the same biometric feature m.

The invention described herein is a unique and practical RFE system relying on a computational hardness assumption known as decisional Learning-with-Error (LWE) assumption (see Literature Reference No. 4 for a description of the LWE assumption) in the random oracle model. One advantage of the invention is that the RFE system is practical and deployable in real applications as opposed to previous RFEs, which are very inefficient in terms of running time and size of public strings.

(3.1) Reusable Fuzzy Extractor and Application in Identification System

A reusable fuzzy extractor consists of two algorithms (Gen, Rec). Gen and Rec stand for generation algorithm and reconstruction algorithm, respectively. The syntactic description of these two algorithms is as follows. Gen takes a biometric feature w as an input and outputs a pair of strings (p, r), where p is a public helper string, and r is a private extracted randomness. Algorithm Rec takes as inputs two strings p and w', where p is a public helper string and w' is a query biometric feature. Then, Rec outputs random string r'. The fuzzy correctness of Rec guarantees that if biometric feature w used to create p is close to the query biometric feature w', then it holds that r=r'. The reusable security guarantees that one can use the noisy biometric feature multiple times to generate multiple public helper strings without any leakage of biometric information.

Figure 3:
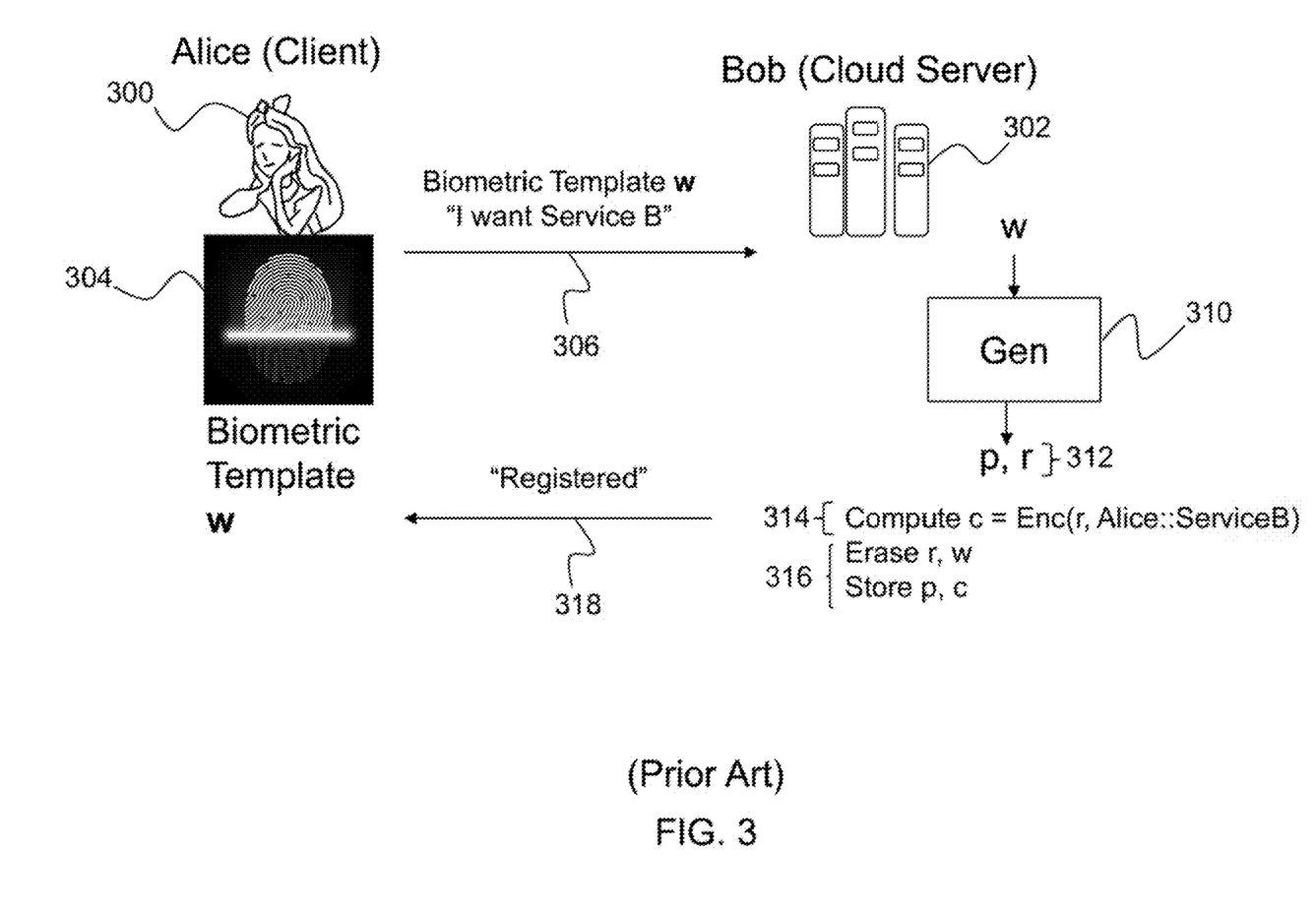
FIG. 3 is an illustration of a registration process based on a RFE according to prior art.
Figure 4:
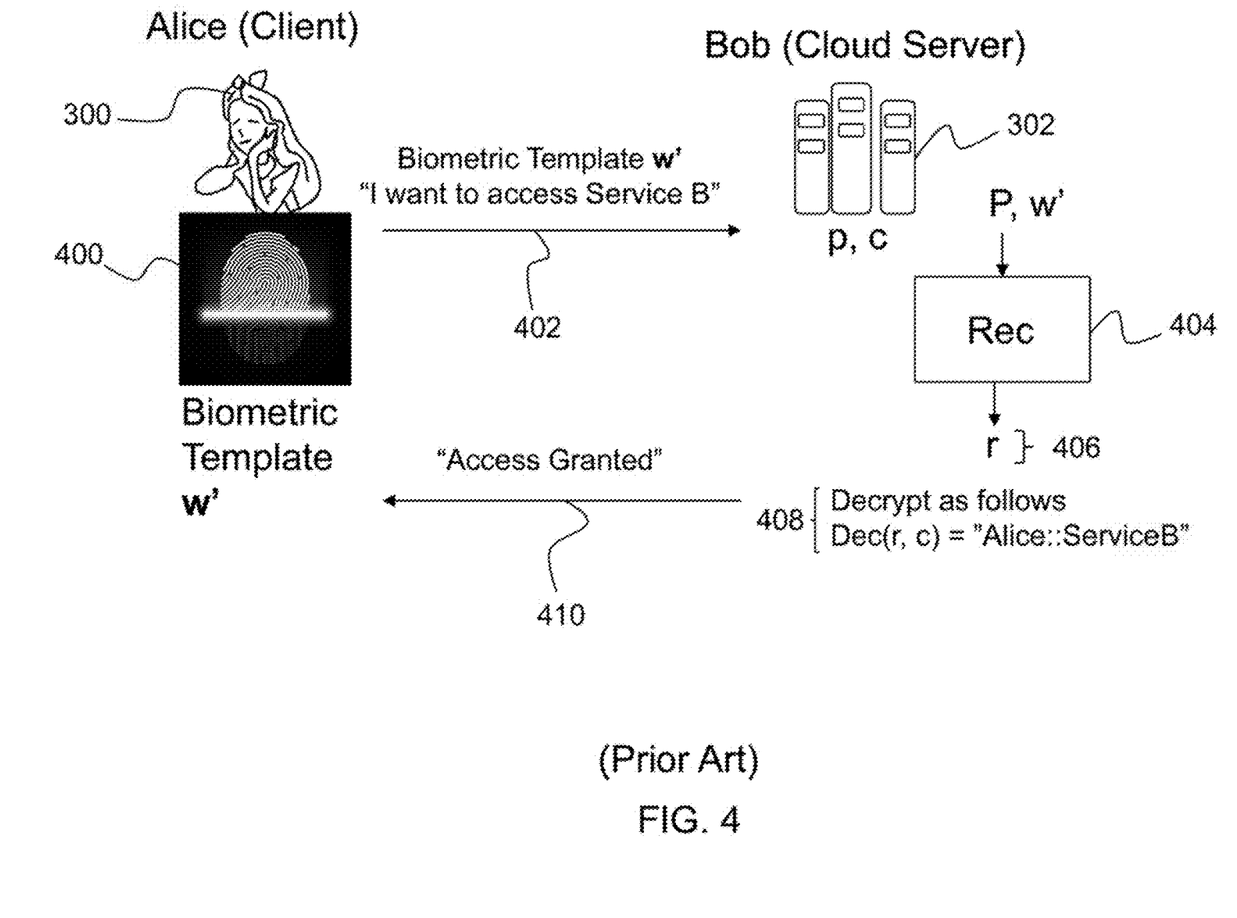
FIG. 4 is an illustration of an identification process based on a RFE according to prior art.

Using this system, one can build a simple biometrics-based identification system. FIGS. 3 and 4 depict an example of a typical identification system according to prior art, with FIG. 3 illustrating the registration process and FIG. 4 illustrating the identification process. Consider two parties, Alice (client) 300 and Bob (server) 302. Alice 300 wants to enroll (element 306) by using her biometric information w 304 (e.g., fingerprint) with Bob 302 for some secure data storage service B. At the initial registration phase (FIG. 3), Alice 300 can use a fingerprint scanner provided by Bob 302 to obtain and send w (element 304 to Bob (element 306). Then, Bob 302 simply runs Gen(w) (element 310) to obtain the pair of strings (element 312) consisting of a public helper string p and a random string r. Bob 302 now encrypts a message "Alice‖ServiceB" under secret key r using any private-key encryption scheme where the resulting ciphertext is c (element 314). Then, Bob erases w and r from the system and only stores p and c (element 316). The biometric template w is now considered registered (element 318).

Note that given p and c, no information about Alice 300 or her biometric data (element 304) is revealed to the adversarial third party even if it completely breaks in the Bob's server 302. As shown in FIG. 4, anytime Alice 300 wants to access her cloud storage of Bob 302, she scans and sends (element 402) biometric feature w' (element 400) to Bob. Now Bob 302 can execute Rec(p,w') (element 404), which outputs the original random string r (element 406) created at the point of initial registration (FIG. 3). Then, Bob 302 can decrypt c by using r as its decryption key to obtain the message "Alice‖ServiceB" (element 408) to find out that the requester is indeed Alice and grants Alice an access to cloud service B (i.e., access granted 410).

As can be appreciated by one skilled in the art, the system may comprise a fingerprint scanner or eye scanner (e.g., iris scanner, retinal scanner) for obtaining the biometric data. A fingerprint scanner is hardware that uses fingerprints for biometric authentication to verify and authenticate identity. Iris scanning biometrics measure unique patterns in the colored circle of an eye to verify and authenticate identity. Iris-based identification requires specific hardware to be used, such as an iris scanner. A retinal scanner uses unique patterns on a person's retina blood vessels for authentication.

(3.2) Settings and Foundational Algorithms

The following is a description of the reusable fuzzy extractor (RFE) in the random oracle model based on LWE assumption according to embodiments of the present disclosure. Standard mathematics notions are used. [1, m] denotes a set of all integers starting from 1 up to m. Bold capital letters (e.g., A) denote a matrix over some field and bold lower-case letters (e.g., b) denote a vector of some length. $A^{-1}$ denotes the inverse of matrix A.

The decoding algorithm for noisy random linear code system, which was proposed by Fuller et. al. (see Literature Reference No. 6), is used as a subroutine in the system according to embodiments of the present disclosure. In the following description, A is a m-by-n matrix whose elements are randomly sampled from field $\mathbb{Z}_q^{m \times n}$ where m≥3n and t=O(log n) denotes the maximum number of errors, and q represents a prime. Crucially, it is assumed that A is a common parameter globally available across the multiple biometric enrollment processes, such that a random single A is designated to a specific individual. Vector b is a vector of length m. Vector e is an error vector of dimension m such that, at most, t coordinates are non-zero. The following describes the Decode algorithm as described by Fuller et al.

-s'←$\text{Decode}_t$(A,b):

1. Select 2n random rows without replacement $i_1, \ldots, i_{2n}$←[1, m].
2. Restrict A, b to rows $i_1, \ldots, i_{2n}$; denote those by $A_{i_1}, \ldots, i_{2n}$, $b_{i_1}, \ldots, i_{2n}$.
3. Find n linearly independent rows of $A_{i_1}, \ldots, i_{2n}$. If no such rows exist, output ⊥ and halt.
4. Further restrict $A_{i_1}, \ldots, i_{2n}$, $b_{i_1}, \ldots, i_{2n}$ to these n rows; denote the result by A', b'.
5. Compute s'=$(A')^{-1}$b'.
6. If b−As' has more than t nonzero coordinates, restart at Step (1).
7. Output s'.

(3.2.1) Decoding Algorithm Decode

The algorithm $\text{Decode}_t$(A,b) takes as input a matrix A in $\mathbb{Z}_q^{m \times n}$ and a vector b of length m and finds a vector s of length n that satisfies b=As+e−e' for some error vectors e and e' of length m, where e−e' has at most t=O(log n) non-zero coordinates.

Step 1. It randomly selects a set of 2n indices between 1 and m

Step 2. It collects the rows and coordinates of input matrix A and vector b, corresponding to the selected indices in Step 1, in order to form a 2n-by-n matrix and vector of length 2n.

Step 3. Find n linearly independent rows in the 2n-by-n matrix formed in Step 2. The output of Step 3 is a n-by-n full rank matrix. Such a full rank matrix is output at this step except with probability at least $1-(\frac{1}{2})^n$.

Step 4. Set this full rank matrix to A' and also set b' to be the vector from 2n length vector in Step 2 according to the same indices as for the rows of A'.

Step 5. Compute $s'=(A')^{-1}b'$. Note that A' is a full rank so invertible.

Step 6. Compute b−As', where b and A are given as inputs and s' is the output of step 5. If b=As+e−e' and e−e' have at most t non-zero coordinates (in other words, e and e' are sufficiently close), it will lead to output s' in Step 7 of the Decode algorithm.

(3.3) Reusable Fuzzy Extractor Algorithms

Given the description of the Decode algorithm above, the following is a description of the RFE according to embodiments of the present disclosure. In the following, H denotes a hash function modeling the random oracle. The standard notation $F^G$ for oracle algorithms is used, where algorithm F has an oracle access to algorithm G, meaning that F can use G in a black-box manner (i.e., F does not need to know the details of the computation performed in G). In the following, pp denotes a common parameter. In this case, pp is a m-by-n matrix A sampled uniformly at random from a field $\mathbb{Z}_q^{m \times n}$ where m≥3n. Again, set t=O(log n). See below for the description of the reusable fuzzy extractor RFE according to embodiments of the present disclosure, which consists of two algorithms ($Gen^H$, $Rec^H$) described as follows.

(3.3.1) Generation Algorithm $Gen^H$

The input to the algorithm $Gen^H$ (called "generation" algorithm) with random oracle H, denoted by $Gen^H$ takes as input a public parameter pp and a vector w of length m, where w is generated based on a biometric reading. The outputs of algorithm $Gen^H$ are a public helper string p and an extracted random string r.

Step 1. It samples a random length n secret vector s. Looking ahead, this is the seed to extract the final randomness r.

Step 2. From the public parameter pp, obtain a m-by-n matrix A and compute the public helper string p=As+w.

Step 3. Extract randomness r by applying random oracle H to s.

Step 4. Output (p,r)

-(p, r)←$Gen^H$ (pp,w):
 1. Sample s∈$\mathbb{Z}_q^n$ uniformly.
 2. Parse pp as A; let p=As+w.
 3. Let r=H(s).
 4. Output (p, r).

-r'←$Rec^H$(pp, w', p):
 1. Parse P as c; let b=c−w'.
 2. Parse pp as A; compute s'=$Decode_t$(A,b).
 3. Output r'=H(s').

(3.3.2) Reconstruction Algorithm $Rec^H$

The input to the algorithm $Rec^H$ (called "reconstruction" algorithm) with random oracle H, denoted by $Rec^H$ takes as input a public parameter pp, a vector w' of length m, where w' is a generated based on a biometric reading, and a public helper string p which contains a length m vector. The output of algorithm $Rec^H$ is an extracted randomness r.

Step 1. Obtain a length m vector c from input public helper string p and compute b=c−w'.

Step 2. Obtain a m-by-n matrix A from input public parameter pp and obtain a length n vector s' by executing $Decode_t$(A,b).

Step 3. Output extracted randomness r'=H(s')

Figure 5:
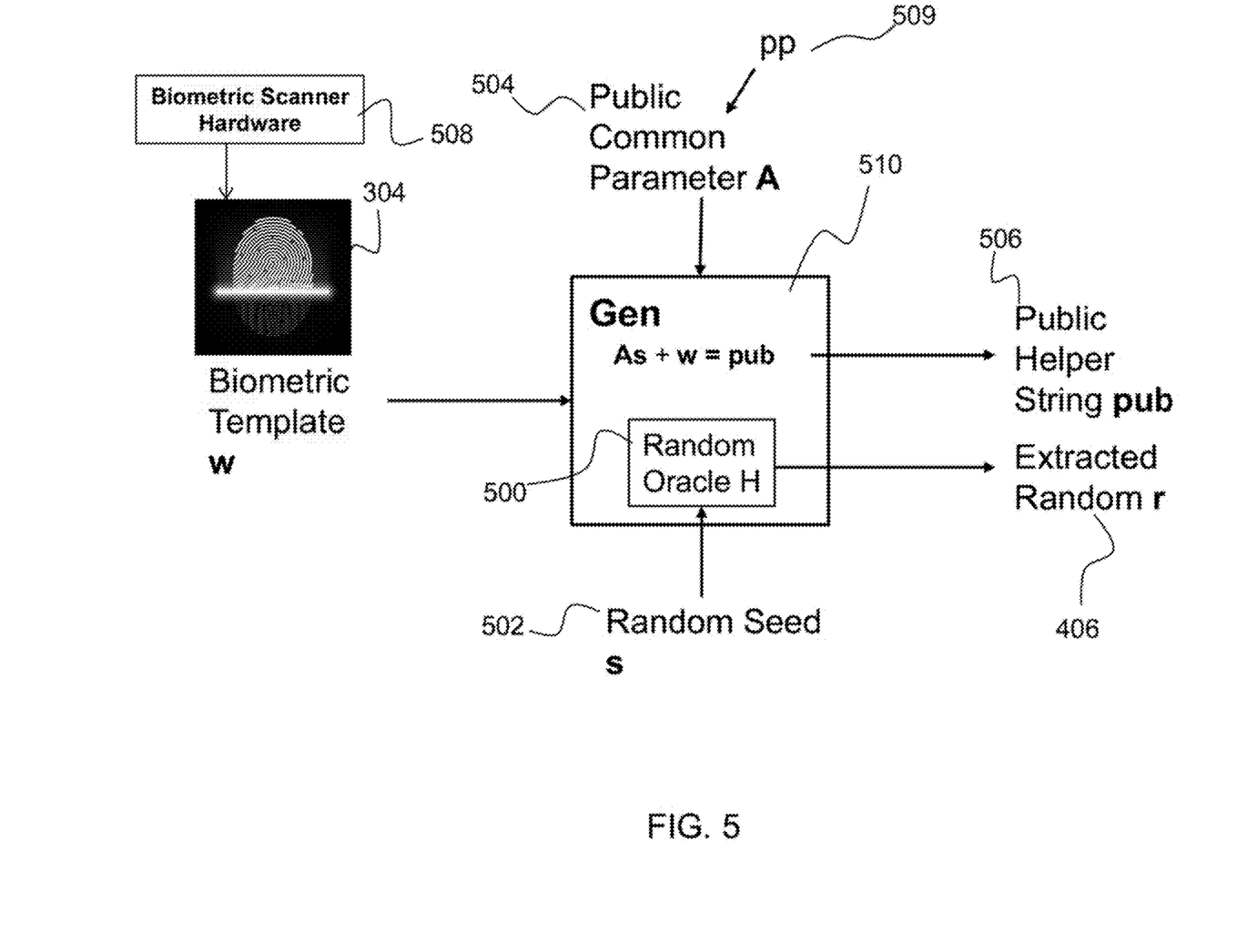
FIG. 5 is an illustration of the algorithm $Gen^H$ according to some embodiments of the present disclosure.

FIG. 5 is a pictorial description of algorithm $Gen^H$. As described above, a biometric template 304 is input to the $Gen^H$ algorithm (element 510) with random oracle H (element 500). A random length n secret vector s is the randomness seed s (element 502) to extract the final randomness r (element 406). Additionally, the $Gen^H$ algorithm (element 310) takes as input a public parameter pp to obtain a m-by-n matrix A (i.e., public common parameter A 504). The outputs of algorithm $Gen^H$ (element 310) are the public helper string p (element 506) and the extracted randomness r (element 406). The biometric template 304 (biometric data) is obtained from biometric scanner hardware 508, such as a fingerprint scanner or an eye scanner, such as an iris or retinal scanner.

Figure 6:
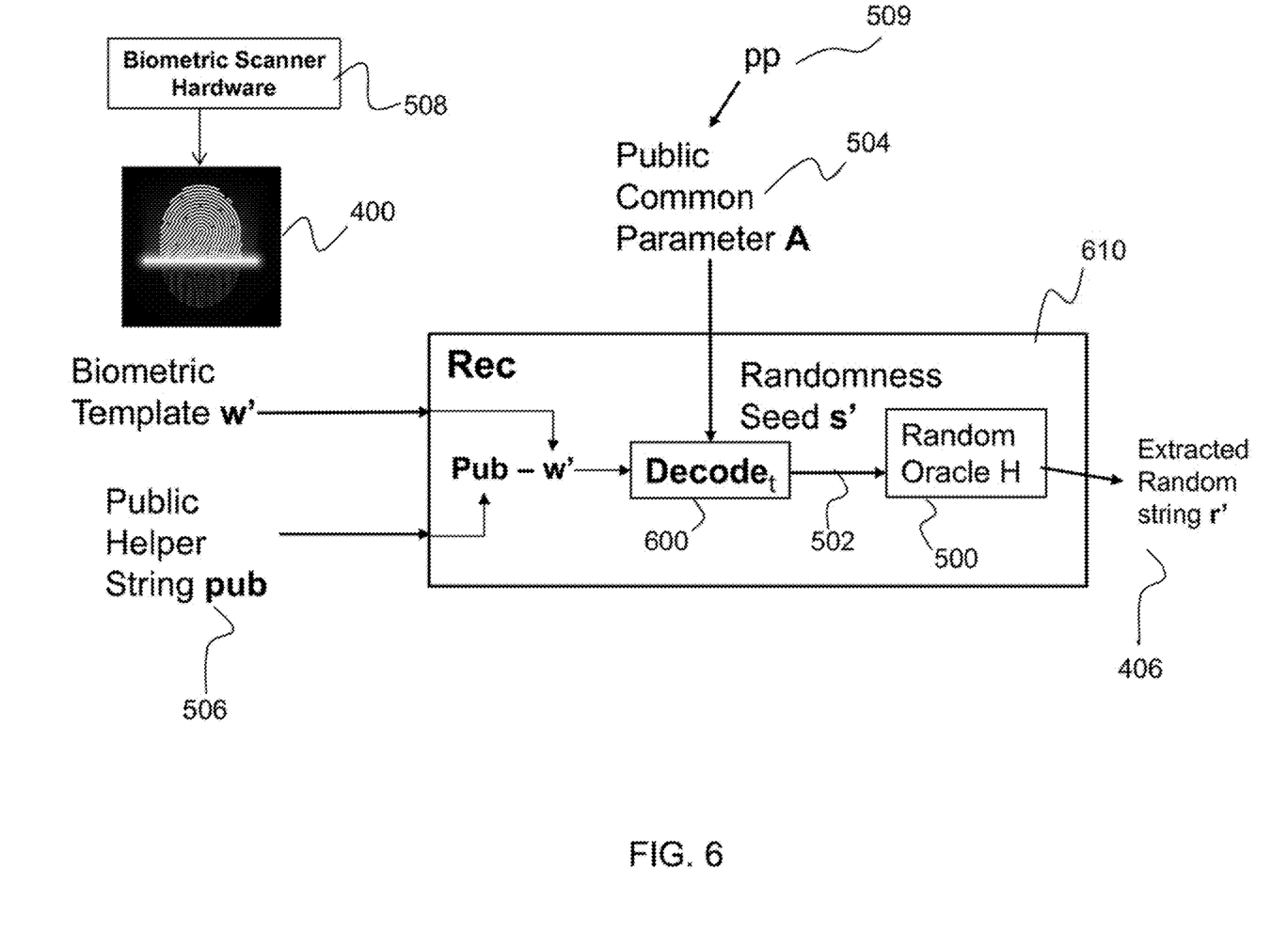
FIG. 6 is an illustration of the algorithm $Rec^H$ according to some embodiments of the present disclosure.

FIG. 6 is a pictorial description of the Reconstruction algorithm $Rec^H$ (element 610). The input to the Reconstruction algorithm $Rec^H$ (element 610) is a public helper string pub (element 506) which contains a length m vector, a vector w' of length m, where w' is generated based on a biometric template (element 400). The output of algorithm $Rec^H$ (element 610) is an extracted randomness r (element 406). An m-by-n matrix A (element 504) is obtained from input public parameter pp (element 509), and a length n vector s' is obtained by executing $Decode_t$(A,b) (element 600). The output is extracted randomness r'=H(s') (element 406).

(3.4) The Estimated Performance

First, the size of the public helper string depends on the order of underlying algebraic field. If the order is q and the length of biometric information in terms of number of field elements is m, then the size of the public helper string is the number of bits (log q)*m, where q is a polynomial in n. The $Gen^H$ algorithm only requires m vector multiplications of n dimensional vectors in $\mathbb{Z}_q$ (e.g., m*n field element multiplications) and a vector addition along with a single execution of hash function instantiating the random oracle H. The $Rec^H$ algorithm's running time is dominated by the computation of Decode in Step 2 of the Reusable Fuzzy Extractor algorithm, of which running time is subsequently dominated by matrix-vector multiplications (e.g., m*n field element multiplications) in Step 6 of the Decode algorithm.

(3.5) Security of the Reusable Fuzzy Extractor ($Gen^H$, $Rec^H$)

The reusable security of the fuzzy extractor according to embodiments of the present disclosure is guaranteed based on the hardness of learning-with-error (LWE) problem and the security of the underlying hash function H. The reusable security implies that even if an adversary is given multiple public helper strings which are generated based on the (possibly noisy) biometric readings of a single biometrics, the adversary cannot obtain any information on the original biometrics or the randomness supposedly extracted by the original biometrics, which is an improvement over existing technologies. Many other fuzzy extractor works do not provide the reusable security so that if an adversary is given more than one public helper strings, then the adversary can extract significant information on the original biometrics as well as the extracted randomness.

The LWE problem is believed to be a hard problem even to quantum adversaries, since no efficient quantum algorithm has been proposed so far. Quantum adversaries represent adversaries that have access to quantum computers. To date, the best-known algorithm to solve the lattice problem reduced to the LWE problem is a strictly exponential time algorithm in its dimension. Also, hash functions (e.g., SHA-256) are also believed to be secure against quantum algorithms. Therefore, assuming the hardness of LWE problem and the security of underlying hash functions against quantum computer, the fuzzy extractor described herein provides the reusable security against quantum adversaries. The RFE described herein relies on the LWE problem, which can be implemented with simple and efficient operations such as matrix and vector multiplications. All previous results relied on the existence of very expensive cryptographic tools; thus, this system provides an improvement in both cost and efficiency.

The invention described herein can be used as a biometric based identification or authentication system (or other types of biometric based systems, such as a key exchange system), or subsystem for other cryptosystems that can utilize noisy biometric information as a cryptographic key. For example, one can build a biometric based identification system used by a user Alice and a server Bob as follows. When Alice wants to enroll with her fingerprint m at the server Bob, the server Bob runs $Gen^H(m)$ and obtains pub and r. Then, Bob encrypts a message "Alice||correct" using r as a cryptographic key for a symmetric encryption scheme. Bob stores only pub and the resulting ciphertext c and erases r from the system. Later, Alice may want to access the database of server Bob. Then, Bob can authenticate the Alice's credential as it reads Alice's fingerprint m' and runs $Rec^H$ (pub, m') to obtain r'. Note that m' might be a noisy version of the original fingerprint m but two readings are close enough (i.e., sufficiently similar) so that r'=r. Finally, Bob decrypts c by using r' to obtain the message "Alice||correct" to verify that the person attempting to access the database is indeed Alice.

A predetermined similarity metric based on the domain/application of use is utilized to determine if the similarity between m' and m. The similarity metric is directly relevant to the authentication security level, which may be up to the application domain. For example, high security will be achieved if two biometric inputs are identical. Alternatively, another user of the system described herein may require a 80% similarity for identification, while another user may require 95% similarity to let an internal member access classified information.

In summary, the fuzzy extractor according to embodiments of the present disclosure is reusable such that multiple public helper strings do not reveal any information on the original biometrics or the corresponding extracted randomness under the assumption that the LWE problem is hard, and the underlying hash function is secure. Moreover, the reusable fuzzy extractor (RFE) described herein has (practically) a very small size of public helper string. For the same biometric template of size 100 bits and the same number of possible errors (e.g., at most 10 bits are erroneous out of 100 bits), the size of public helper string of the RFE according to this disclosure is only 12 KB whereas the size of other RFEs providing the similar reusable security (e.g., Literature Reference Nos. 1 and 3) is more than 3 MB. If the underlying instantiation of random oracle H (e.g., hash functions) is proven to be secure and the LWE assumption holds against quantum adversaries, then the whole reusable fuzzy extractor system according to embodiments of the present disclosure is secure against quantum adversaries.

Figure 7:
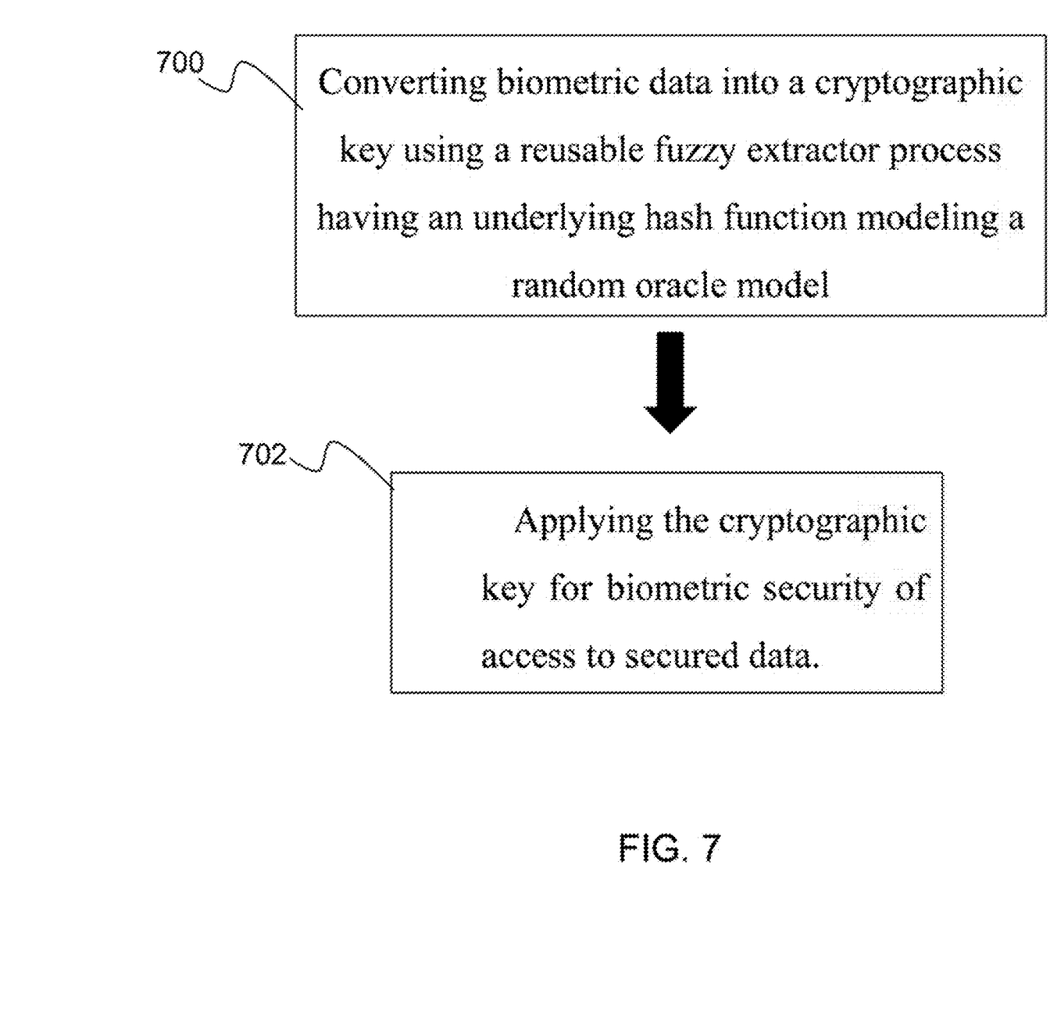
FIG. 7 is a flow diagram illustrating a RFE cryptographic system according to some embodiments of the present disclosure.

FIG. 7 is a flow diagram illustrating a RFE cryptographic system according to embodiments of the present disclosure, where the system converting biometric data into a cryptographic key using a reusable fuzzy extractor process having an underlying hash function modeling a random oracle model (element 700), and the cryptographic key is applied for biometric security of access to secured data (element 702).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for biometric authentication, the system comprising:
    one or more processors and a non-transitory computer-readable medium having executable instructions encoded thereon such that when executed, the one or more processors perform operations of:
        converting biometric data into a cryptographic key r' using a reusable fuzzy extractor process having reusable security with a single execution of a hash function instantiating a random oracle,
        wherein the reusable fuzzy extractor process comprises a generation process, $Gen^H$, and a reconstruction process, $Rec^H$,
        wherein the generation process $Gen^H$ comprises:
            receiving, as input, a public parameter pp and a vector w of length m, where the vector w is based on a first biometric input, wherein the public parameter pp is a m-by-n matrix sampled uniformly at random from a field $\mathbb{Z}_q^{m \times n}$ where m≥3n and q is a polynomial in n;
            sampling a secret vector s;
            computing a public helper string p having a size using the matrix, the secret vector s, and the biometric input,
            wherein the size of the public helper string p is a number of bits (log q)*m; and
            extracting a first random string by applying the random oracle to the secret vector s, and
        wherein the reconstruction process $Rec^H$ comprises:
            receiving, as input, a public parameter pp, a public helper string p, a vector w' of length m, where the vector w' is based on a second biometric input, wherein the public parameter pp is a m-by-n matrix;
            obtaining a secret vector s' by executing a decoding algorithm on the matrix; and
            extracting a second random string by applying the random oracle to the secret vector s';
        allowing access to a secured service when a comparison of r' to a previously computed cryptographic key r shows a match.

2. The system as set forth in claim 1, wherein when the first biometric input is sufficiently similar to the second biometric input, the first random string is considered equivalent to the second random string, and the second random string is used to verify access to the secured service.

3. The system as set forth in claim 1, wherein the biometric data is a fingerprint and the secured service is accessed through a server.

4. The system as set forth in claim 1, wherein the biometric data is a fingerprint and the secured service is accessed through a server, and wherein the one or more processors perform an operation of enabling electronic communication between a user and a server,
    wherein the electronic communication between the user and the server comprises the following:
        enrolling, by the user, a first fingerprint at the server;

performing, by the server, the generation process $Gen^H$ for obtaining the public helper string p and the first random string;

encrypting, by the server, a message using the first random string as a cryptographic key for a symmetric encryption scheme, resulting in a ciphertext;

storing, by the server, the public helper string p;

erasing, by the server, the first random string;

authenticating the user, by the server, by processing a second fingerprint and performing the reconstruction process $Rec^H$ for obtaining the second random string, wherein if the first fingerprint is sufficiently similar to the second fingerprint, then the first random string is considered equivalent to the second random string; and decrypting, by the server, the ciphertext using the second random string to obtain the message to verify the user attempting to access the server.

5. The system as set forth in claim 1, wherein the system further comprises a fingerprint scanner for obtaining the biometric data.

6. The system as set forth in claim 1, wherein the system further comprises an eye scanner for obtaining the biometric data.

7. A computer implemented method for biometric authentication, the method comprising an act of:

causing one or more processers to execute instructions encoded on a non-transitory computer-readable medium, such that upon execution, the one or more processors perform operations of:

converting biometric data into a cryptographic key r' using a reusable fuzzy extractor process having reusable security with a single execution of a hash function instantiating a random oracle, wherein the reusable fuzzy extractor process comprises a generation process, $Gen^H$, and a reconstruction process, $Rec^H$, wherein the generation process $Gen^H$ comprises:

receiving, as input, a public parameter pp and a vector w of length m, where the vector w is based on a first biometric input, wherein the public parameter pp is a m-by-n matrix sampled uniformly at random from a field $\mathbb{Z}_q^{m \times n}$ where m≥3n and q is a polynomial in n;

sampling a secret vector s;

computing a public helper string p having a size using the matrix, the secret vector s, and the biometric input, wherein the size of the public helper string p is a number of bits (log q)*m; and extracting a first random string by applying the random oracle to the secret vector s, and wherein the reconstruction process $Rec^H$ comprises:

receiving, as input, a public parameter pp, a public helper string p, a vector w' of length m, where the vector w' is based on a second biometric input, wherein the public parameter pp is a m-by-n matrix;

obtaining a secret vector s' by executing a decoding algorithm on the matrix; and extracting a second random string by applying the random oracle to the secret vector s';

allowing access to a secured service when a comparison of r' to a previously computed cryptographic key r shows a match.

8. The method as set forth in claim 7, wherein when the first biometric input is sufficiently similar to the second biometric input, the first random string is considered equivalent to the second random string, and the second random string is used to verify access to the secured service.

9. The method as set forth in claim 7, wherein the biometric data is a fingerprint and the secured service is accessed through a server.

10. The method as set forth in claim 7, wherein the biometric data is a fingerprint and the secured service is accessed through a server, and wherein the one or more processors perform an operation of enabling electronic communication between a user and a server, wherein the electronic communication between the user and the server comprises the following:

enrolling, by the user, a first fingerprint at the server;

performing, by the server, the generation process $Gen^H$ for obtaining the public helper string p and the first random string;

encrypting, by the server, a message using the first random string as a cryptographic key for a symmetric encryption scheme, resulting in a ciphertext;

storing, by the server, the public helper string p;

erasing, by the server, the first random string;

authenticating the user, by the server, by processing a second fingerprint and performing the reconstruction process $Rec^H$ for obtaining the second random string, wherein if the first fingerprint is sufficiently similar to the second fingerprint, then the first random string is considered equivalent to the second random string; and decrypting, by the server, the ciphertext using the second random string to obtain the message to verify the user attempting to access the server.

11. A computer program product for biometric authentication, the computer program product comprising:

a non-transitory computer-readable medium having computer-readable instructions encoded thereon that are executable by a computer having one or more processors for causing the processor to perform operations of:

converting biometric data into a cryptographic key r' using a reusable fuzzy extractor process having reusable security with a single execution of a hash function instantiating a random oracle, wherein the reusable fuzzy extractor process comprises a generation process, $Gen^H$, and a reconstruction process, $Rec^H$, wherein the generation process $Gen^H$ comprises:

receiving, as input, a public parameter pp and a vector w of length m, where the vector w is based on a first biometric input, wherein the public parameter pp is a m-by-n matrix sampled uniformly at random from a field $\mathbb{Z}_q^{m \times n}$ where m≥3n and q is a polynomial in n;

sampling a secret vector s;

computing a public helper string p having a size using the matrix, the secret vector s, and the biometric input, wherein the size of the public helper string p is a number of bits (log q)*m; and extracting a first random string by applying the random oracle to the secret vector s, and wherein the reconstruction process $Rec^H$ comprises:

receiving, as input, a public parameter pp, a public helper string p, a vector w' of length m, where the vector w' is based on a second biometric input, wherein the public parameter pp is a m-by-n matrix;

obtaining a secret vector s' by executing a decoding algorithm on the matrix; and extracting a second random string by applying the random oracle to the secret vector s';

allowing access to a secured service when a comparison of r' to a previously computed cryptographic key r shows a match.

12. The computer program product as set forth in claim 11, wherein when the first biometric input is sufficiently similar to the second biometric input, the first random string is considered equivalent to the second random string, and the second random string is used to verify access to the secured service.

13. The computer program product as set forth in claim 11, wherein the biometric data is a fingerprint and the secured services are accessed through a server.

14. The computer program product as set forth in claim 11, wherein the biometric data is a fingerprint and the secured service is accessed through a server, and wherein the computer program product further comprises instructions for causing the one or more processors to perform an operation of enabling electronic communication between a user and a server, wherein the electronic communication between the user and the server comprises the following:

enrolling, by the user, a first fingerprint at the server;

performing, by the server, the generation process $Gen^H$ for obtaining the public helper string p and the first random string;

encrypting, by the server, a message using the first random string as a cryptographic key for a symmetric encryption scheme, resulting in a ciphertext;

storing, by the server, the public helper string p;

erasing, by the server, the first random string;

authenticating the user, by the server, by processing a second fingerprint and performing the reconstruction process $Rec^H$ for obtaining the second random string, wherein if the first fingerprint is sufficiently similar to the second fingerprint, then the first random string is considered equivalent to the second random string; and decrypting, by the server, the ciphertext using the second random string to obtain the message to verify the user attempting to access the server.

* * * * *